(12) United States Patent
Chen et al.

(10) Patent No.: US 7,223,004 B2
(45) Date of Patent: May 29, 2007

(54) LIGHT GUIDE PLATE WITH NARROWED CENTER AND SURFACE LIGHT SOURCE DEVICE INCORPORATING SAME

(75) Inventors: Ga-Lane Chen, Fremont, CA (US); Charles Leu, Fremont, CA (US)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 201 days.

(21) Appl. No.: 10/828,066

(22) Filed: Apr. 19, 2004

(65) Prior Publication Data

US 2004/0208471 A1  Oct. 21, 2004

(30) Foreign Application Priority Data

Apr. 18, 2003  (TW) ............................. 92206134 U

(51) Int. Cl.
  *F21V 8/00*  (2006.01)
(52) U.S. Cl. .................... 362/611; 362/561; 362/619; 362/626
(58) Field of Classification Search ................ 362/611, 362/610, 615, 617, 619, 620, 623, 625, 626, 362/628, 511, 330, 561
See application file for complete search history.

(56) References Cited

U.S. PATENT DOCUMENTS

| | | | |
|---|---|---|---|
| 3,163,367 A | * | 12/1964 | Bodian ........................ 362/330 |
| 5,899,552 A | * | 5/1999 | Yokoyama et al. ......... 362/619 |
| 5,999,685 A | * | 12/1999 | Goto et al. ................. 385/146 |
| 6,232,592 B1 | * | 5/2001 | Sugiyama ............... 250/227.11 |
| 6,259,854 B1 | * | 7/2001 | Shinji et al. ................ 385/146 |
| 6,540,368 B2 | * | 4/2003 | Akaoka ...................... 362/610 |

FOREIGN PATENT DOCUMENTS

CN  99214211  11/1999

* cited by examiner

*Primary Examiner*—Sandra O'Shea
*Assistant Examiner*—Sharon E. Payne
(74) *Attorney, Agent, or Firm*—Wei Te Chung

(57) ABSTRACT

A light guide plate includes two opposite incident surfaces for receiving light beams, an emitting surface joining the two incident surfaces and a bottom surface opposite to the emitting surface. The emitting surface has a V-shaped profile defined by two symmetric oblique surfaces slanting down toward each other at a predetermined angle. Further, each of the oblique surfaces defines a plurality of grooves extending therein and being arranged along an oblique direction thereof. The surface light source incorporating the light guide plate is inexpensive and has higher intensity of illumination at the center region thereof. Thus a liquid crystal display incorporating the surface light source satisfactorily illuminates a main visible range thereof.

20 Claims, 5 Drawing Sheets

LIGHT GUIDE PLATE WITH NARROWED CENTER AND SURFACE LIGHT SOURCE DEVICE INCORPORATING SAME

BACKGROUND OF THE INVENTION

1. Field of the Invention

The present invention relates to a light guide plate and a surface light source device incorporating the light guide plate, especially to a light guide plate configure to provide high light intensity at a center thereof.

2. Prior Art

Liquid crystal displays are thin, lightweight, and have low power consumption. Owing to these characteristics, liquid crystal displays have been widely used in the fields of communications and consumer products, in devices such as personal computers, liquid crystal TVs, image telephones, PDAs (personal digital assistants), etc. The liquid crystal display is a passive device, which must usually incorporate a surface light source device in order to provide images.

A conventional surface light source device 10 is illustrated in FIG. 9. The surface light source device 10 includes a light guide plate 1, a reflector 2 arranged on a bottom surface 11 of the light guide plate 1, a diffuser 3 arranged on an emitting surface 12 of the light guide plate 1, a light source 6 positioned adjacent to an incident surface 13 of the light guide plate 1, a reflector positioned behind the light source 6, and two prism sheets 4, 5 arranged on the diffuser 3. In operation, light beams coming from the light guide plate 1 are scattered by the diffuser 3, and uniformly emit from the diffuser 3. The light beams are then converged by the prism sheets 4, 5 to improve the intensity of illumination. However, the surface light source device 10 has numerous elements, which makes it unduly thick and costly. The light beams must pass through a plurality of interfaces before emitting from the prism sheet 5, which reduces the intensity of the emitted light.

FIG. 10 shows a surface light source device 20 as disclosed in China Patent No. CN99214211. The surface light source device 20 includes a light guide plate 21, a reflector 22, a light source 24, and a diffusing film 23. A plurality of terraced printing lines 261 is defined on an emitting surface 26 of the light guide plate 21, to enhance the light intensity thereof. However, light beams from the light source 24 are converged only along a direction of the printing lines 261. Therefore, the light beams cannot be utilized efficiently, and the light intensity of the surface light source device 20 is relatively poor.

In order to solve these problems, China Patent No. CN98207946 provides a light guide plate which comprises a prism array with single axis on an emitting surface, in order to increase the intensity of emitted light. Alternatively, a prism array with two axes can be defined on the emitting surface. However, a liquid crystal display generally needs a higher intensity of illumination in a center region of a display screen thereof, in order to satisfactorily illuminate a main visible range of the liquid crystal display. The light guide plate does not provide the required illumination.

SUMMARY OF THE INVENTION

An object of the present invention is to provide a light guide plate having a higher intensity of illumination at a center region thereof.

Another object of the present invention is to provide a surface light source device having a light guide plate with higher intensity of illumination at a center region thereof, and which is inexpensive.

In order to achieve the objects above, a light guide plate in accordance with one embodiment of the present invention comprises two opposite incident surfaces for receiving light beams, an emitting surface interconnecting the two incident surfaces, and a bottom surface opposite to the emitting surface. A thickness of a center portion of the light guide plate is less than thicknesses of two peripheral portions of the light guide plate that are at opposite sides of the center portion.

Also in order to achieve the objects above, a surface light source device in accordance with another embodiment of the present invention comprising a light guide plate and two light sources. The light guide plate comprises two opposite incident surfaces for receiving light beams, an emitting surface between the incident surfaces, and a bottom surface opposite to the emitting surface. The two light sources are disposed adjacent to the incident surfaces respectively of the light guide plate. A thickness of a center portion of the light guide plate is less than thicknesses of two peripheral portions of the light guide plate that are at opposite sides of the center portion The surface light source incorporating the light guide plate is inexpensive and has higher intensity of illumination at the center region thereof. Thus a liquid crystal display incorporating the surface light source satisfactorily illuminate a main visible range thereof.

These and other features, aspects and advantages of the present invention will become more apparent from the following detailed description and claims, and from the accompanying drawings in which:

DESCRIPTION OF THE PREFERRED EMBODIMENTS

Reference will now be made to the drawings to describe the present invention in detail.

Figure 1:
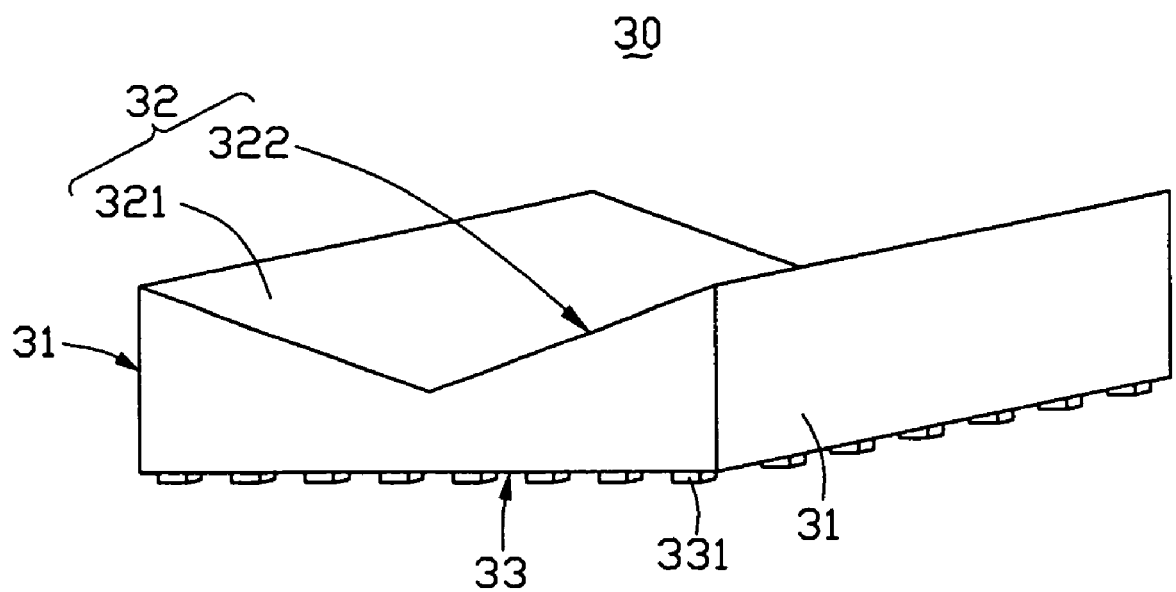
FIG. 1 is an isometric view of a first embodiment of a light guide plate according to the present invention.

Referring to FIG. 1, a light guide plate 30 according to a first embodiment of the present invention is generally made from transparent material. The light guide plate 30 has two opposite incident surfaces 31 for receiving incident light beams, an emitting surface 32 located between the incident surfaces 31, and a planar bottom surface 33 opposite to the emitting surface 32. The emitting surface 32 has a V-shaped profile which is defined by two symmetric oblique surfaces 321, 322 slanting down toward each other at a predetermined angle. Therefore, light beams from opposite light sources (not shown) are reflected and emit from the emitting surface 32, with increasing intensity proportional to increasing distance away from the light sources. That is, an intensity of illumination is highest at a junction of the two oblique surfaces 321, 322. The light guide plate 30 further comprises a plurality of scattering dots 331 on the bottom surface 33. Each scattering dot 331 is a micro-prism, which may be parallelepiped-shaped, hemispherical, cylindrical or frustum-shaped. The scattering dots 331 can be injection molded integrally with the light guide plate 30, or formed by printing.

Figure 2:
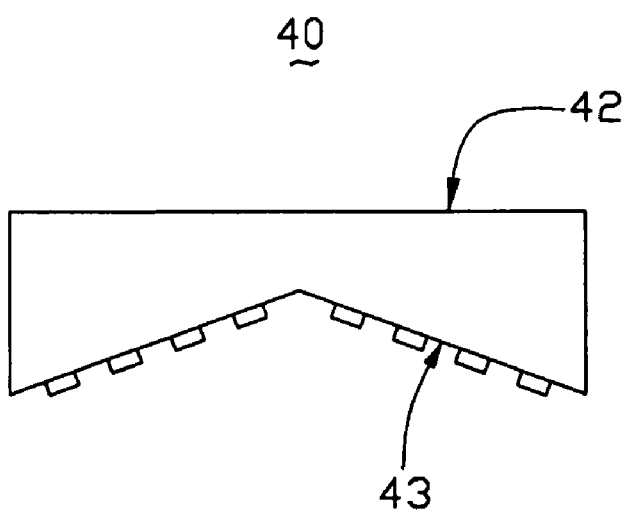
FIG. 2 is a side elevation of a second embodiment of a light guide plate according to the present invention.

Referring to FIG. 2, a light guide plate 40 according to a second embodiment of the present invention is similar to the light guide plate 30 of the first embodiment, except that a bottom surface 43 of the light guide plate 40 has a V-shaped profile and an emitting surface 42 is planar. Such structure of the light guide plate 40 can provide the same high optical performance attained by the light guide plate 30 as described above.

Figure 3:
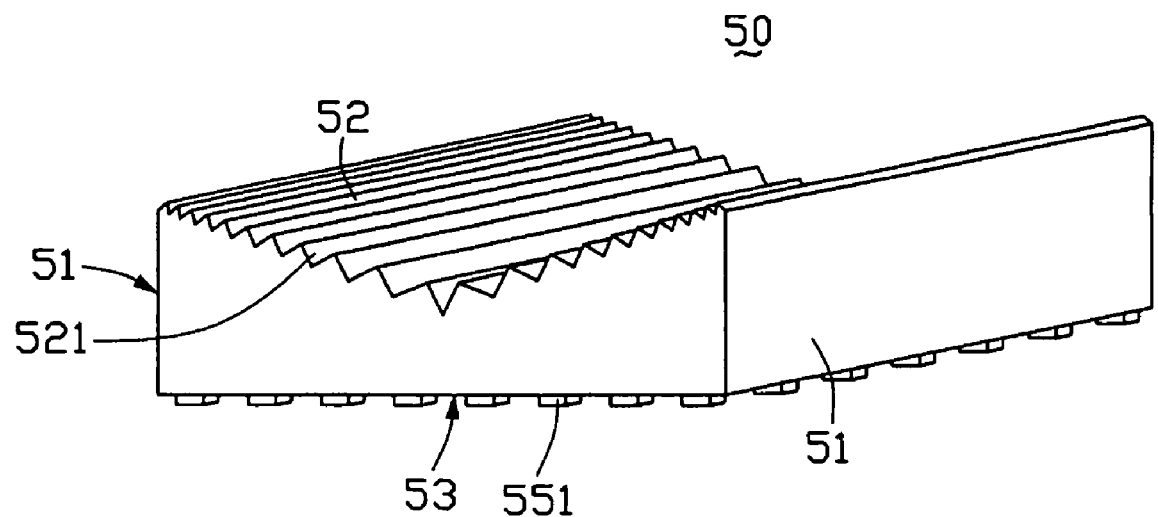
FIG. 3 is an isometric view of a third embodiment of a light guide plate according to the present invention.

Referring to FIG. 3, a light guide plate 50 according to a third embodiment of the present invention is similar to the light guide plate 30 of the first embodiment. The only difference is that an emitting surface 52 of the light guide plate 50 has a plurality of V-shaped grooves 521. The V-shaped grooves 521 may have different angles, heights and widths, such that the angles, heights and widths all progressively increase in size from each of two incident surfaces 51 to a middle of the emitting surface 52. The angles of the V-shaped grooves 521 vary in the range from 70 degrees to 110 degrees, and preferably in the range from 80 degrees to 100 degrees. The heights of the V-shaped grooves 521 vary in the range from 20 um to 100 um, and preferably in the range from 40 um to 60 um. Maximum widths of the V-shaped grooves 521 vary in the range from 50 um to 200 um, and preferably in the range from 75 um to 125 um. Alternatively, the V-shaped grooves 521 may have the same angle, height and width. Further, each groove 521 may alternatively be step-shaped, polygonal, or have another suitable configuration. The V-shaped grooves 521 can be injection molded integrally with the light guide plate 50. Alternatively, the V-shaped grooves 521 can be formed by chemical etching, laser printing, mechanical processing, light etching, etc. The light guide plate 50 also comprises a bottom surface 53, and a plurality of scattering dots 551 is provided on the bottom surface 53.

Figure 4:
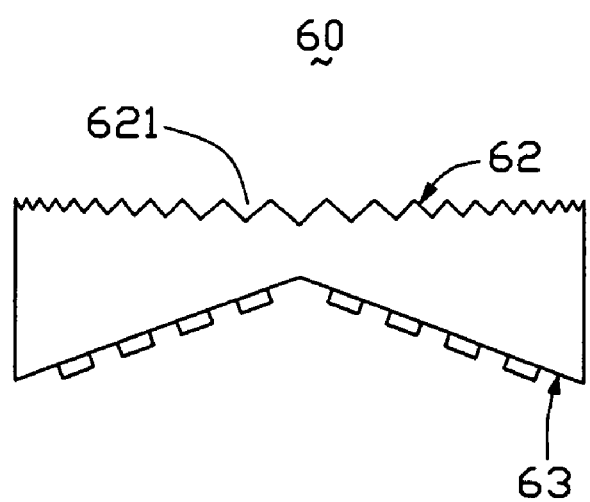
FIG. 4 is a side elevation of a fourth embodiment of a light guide plate according to the present invention.

Referring to FIG. 4, a light guide plate 60 according to a fourth embodiment of the present invention is similar to the light guide plate 40 of the second embodiment. The only difference is that an emitting surface 62 of the light guide plate 60 has a plurality of V-shape grooves 621. The V-shaped grooves 621 may have different angles, heights and widths, such that the angles, heights and widths all progressively increase in size from each of two opposite incident surfaces (not labeled) to a middle of the emitting surface 62. The light guide plate 60 also has a bottom surface 63.

Figure 5:
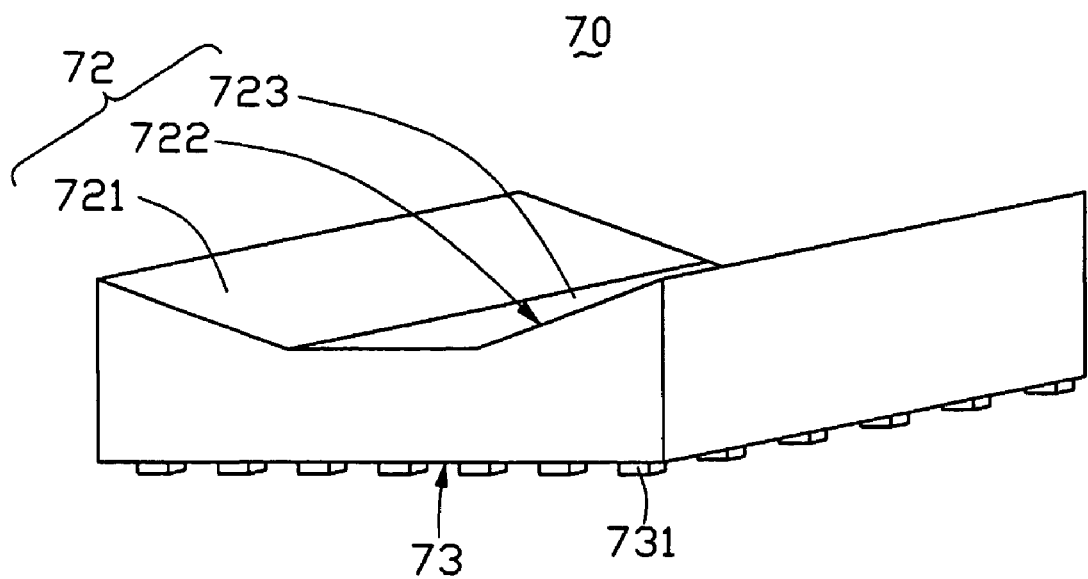
FIG. 5 is an isometric view of a fifth embodiment of a light guide plate according to the present invention.

Referring to FIG. 5, a light guide plate 70 according to a fifth embodiment of the present invention is similar to the light guide plate 30 of the first embodiment. The only difference is that an emitting surface 72 has three surfaces 721, 722, 723. The surfaces 721, 723 are symmetric oblique surfaces that slant down toward each other at a predetermined angle. The surface 722 is an intermediate surface interconnecting the oblique surfaces 721, 723. The intermediate surface 722 is parallel to a bottom surface 73 of the light guide plate 70. In addition, a plurality of scattering dots 731 is provided on the bottom surface 73.

Figure 6:
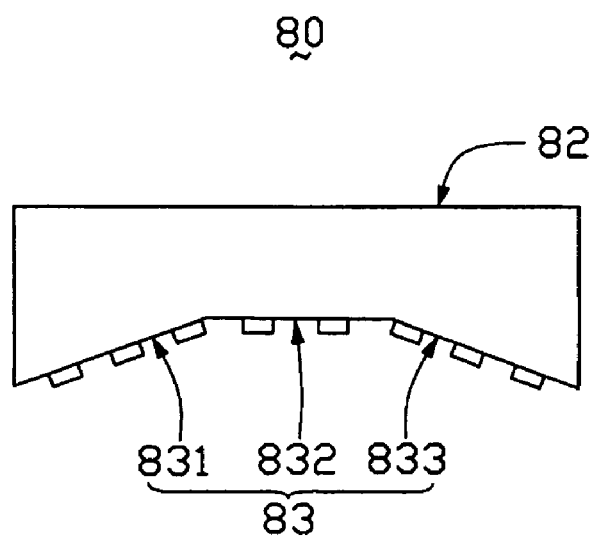
FIG. 6 is a side elevation of a sixth embodiment of a light guide plate according to the present invention.

Referring to FIG. 6, a light guide plate 80 according to a sixth embodiment of the present invention is similar to the light guide plate 70 of the fifth embodiment. The only difference is that a bottom surface 83 has three surfaces 831, 832, 833. The surfaces 831, 833 are symmetric oblique surfaces that slant up toward each other at a predetermined angle. The surface 832 is an intermediate surface interconnecting the oblique surfaces 831, 833. The intermediate surface 832 is parallel to an emitting surface 82.

Figure 7:
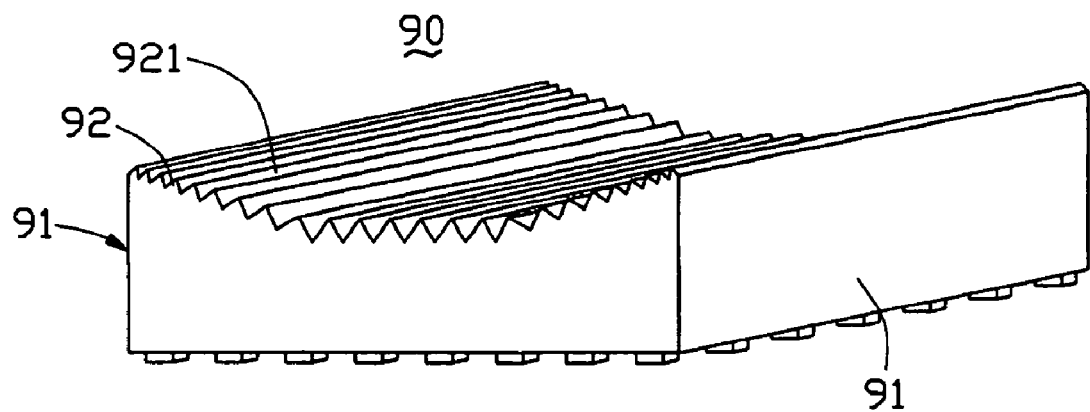
FIG. 7 is an isometric view of a seventh embodiment of a light guide plate according to the present invention.

Referring also to FIG. 7, a light guide plate 90 according to a seventh embodiment of the present invention is similar to the light guide plate 70 of the fifth embodiment. The only difference is that an emitting surface 92 of the light guide plate 90 has a plurality of V-shaped grooves 921. The V-shape grooves 921 may have different angles, heights and widths, such that the angles, heights and widths progressively increase in size from each of two opposite incident surfaces 91 to a middle of the emitting surface 92. The angles of the V-shaped grooves 921 vary in the range from 70 degrees to 110 degrees, and preferably in the range from 80 degrees to 100 degrees. The heights of the V-shaped grooves 921 vary in the range from 20 um to 100 um, and preferably in the range from 40 um to 60 um. Maximum widths of the V-shaped grooves 921 vary in the range from 50 um to 200 um, and preferably in the range from 75 um to 125 um. Preferably, the V-shaped grooves 921 at a generally horizontal middle portion of the emitting surface 92 have the same angle, height and width. Alternatively, all the V-shaped grooves 921 may have the same angle, height and width. Further, each groove 921 may alternatively be step-shaped, polygonal, or have another suitable configuration. The V-shaped grooves 921 can be injection molded integrally with the light guide plate 90. Alternatively, the V-shaped grooves 921 can be formed by chemical etching, laser printing, mechanical processing, light etching, etc.

Further alternative embodiments of the light guide plates 30, 40, 50, 60, 70, 80, 90 of the first through seventh embodiments can be configured. In particular, the emitting surfaces 32, 42, 52, 62, 72, 82 may have essentially concave profiles instead of essentially linear profiles. Further or alternatively, the bottom surfaces 33, 43, 53, 63, 73, 83 may have essentially concave profiles instead of essentially linear profiles.

Figure 8:
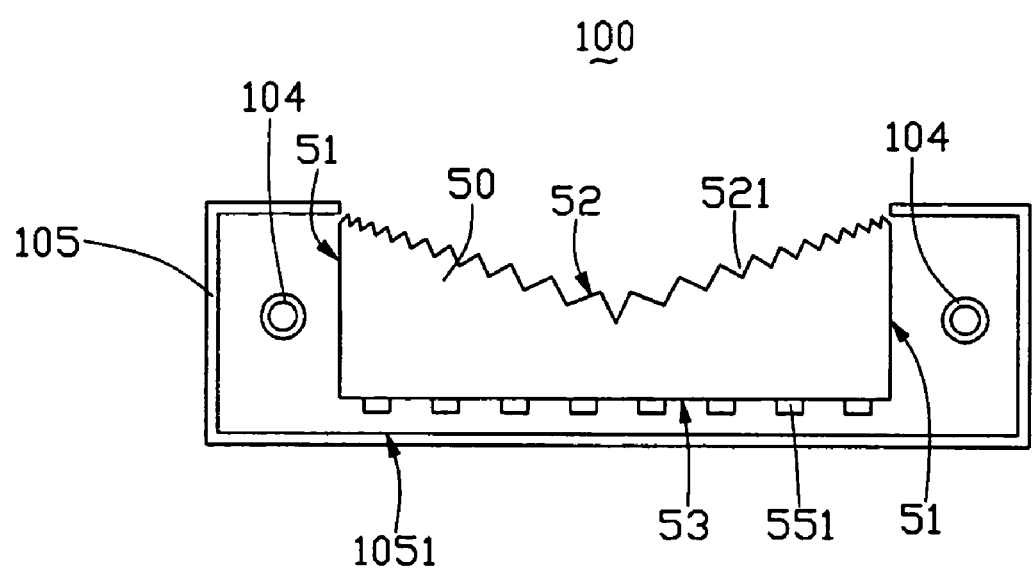
FIG. 8 is a schematic, cross-sectional view of a surface light source device of the present invention incorporating the light guide plate of FIG. 3.
Figure 9:
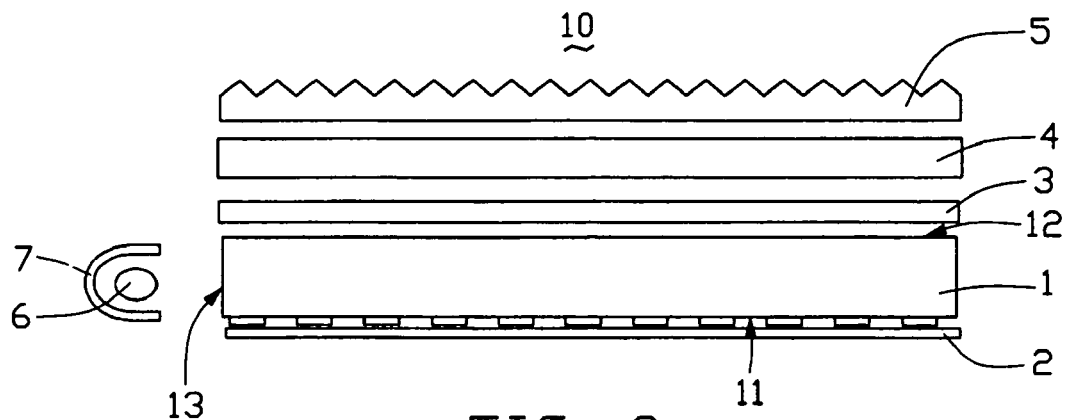
FIG. 9 is an exploded, side elevation of a conventional surface light source device.
Figure 10:
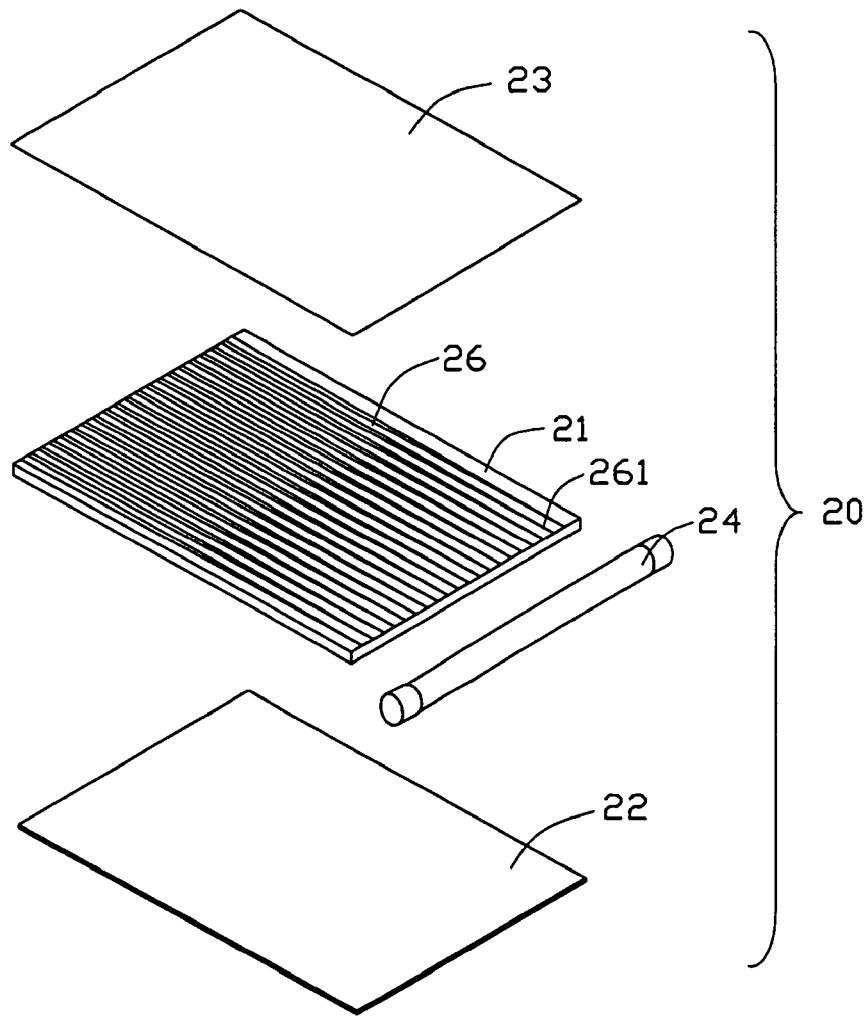
FIG. 10 is an exploded, isometric view of another conventional surface light source device.

Referring to FIG. 8, a surface light source device 100 of the present invention includes the light guide plate 50, two light sources 104 respectively adjacent to the incident surfaces 51 of the light guide plate 50, and a shell-shaped reflector 105. The reflector 105 substantially encloses the light sources 104, the bottom surface 53 and opposite side surfaces of the light guide plate 50, in order to reflect light beams from the light sources 104 to the light guide plate 110. In particular, two opposite first parts (not labeled) of the reflector 105 reflect light beams from the light sources 104 to the incident surfaces 51, and an intermediate second part (not labeled) of the reflector 105 reflects light beams to the bottom surface 53. An inner surface 1051 of the reflector 105 which is opposite to the bottom surface 53 and the incident surfaces 51 has high reflectivity, between 90% and 99%. This is obtained by plating the inner surface 1051 with a highly reflective metal or oxide material by way of ion plating, sputtering or another suitable method. The metal or oxide material can be gold (Au), silver (Ag), or titanium oxide (TiO$_2$). Each light source 104 is a cold cathode fluorescent lamp or a light emitting diode.

Similarly, any of the light guide plates 30, 40, 60, 70, 80, 90 of the first, second and fourth through seventh embodiments can be combined with the light sources 104 and the reflector 105 to provide a surface light source device similar to the surface light source device 100 described above.

While the present invention has been described with reference to particular embodiments, the description is illustrative of the invention and is not to be construed as limiting the invention. Therefore, various modifications of the described embodiments can be made by those skilled in the art without departing from the true spirit and scope of the invention as defined by the appended claims.

The invention claimed is:

1. A light guide plate comprising:
   two opposite incident surfaces configured for receiving light beams;
   an emitting surface between the two incident surfaces configured for emitting the light beams therefrom; and
   a bottom surface opposite to the emitting surface;
   wherein a thickness of a center portion of the light guide plate is less than thicknesses of two peripheral portions of the light guide plate that are at opposite sides of the center portion, and wherein the emitting surface has a V-shaped profile defined by two oblique surfaces slanting down toward each other, each of the two oblique surfaces defines a plurality of grooves extending therein and being arranged along an oblique direction thereof.

2. The light guide plate according to claim 1, wherein the two oblique surfaces are symmetric and slant down toward each other at a predetermined angle.

3. The light guide plate according to claim 2, wherein the emitting surface further comprises a surface parallel to the bottom surface and interconnecting the oblique surfaces.

4. The light guide plate according to claim 1, wherein the bottom surface has a V-shaped profile defined by two symmetric oblique surfaces slanting up toward each other at a predetermined angle.

5. The light guide plate according to claim 4, wherein the bottom surface further comprises a surface interconnecting the oblique surfaces.

6. The light guide plate according to claim 1, wherein the grooves defined in each of the two oblique surfaces are V-shaped grooves.

7. The light guide plate according to claim 6, wherein the V-shaped grooves have a same angle, height and width.

8. The light guide plate according to claim 6, wherein any one or more of the angles, heights and widths of the V-shaped grooves progressively increase in size from the incident surfaces to a middle of the emitting surface.

9. The light guide plate according to claim 8, wherein angles of the V-shaped grooves vary in the range from 70 degrees to 110 degrees, heights of the V-shaped grooves vary in the range from 20 to 100 micrometers, and widths of the V-shaped grooves vary in the range from 50 to 200 micrometers.

10. The light guide plate according to claim 1, wherein the emitting surface defines a plurality of step-shaped grooves, a plurality of polygonal grooves, or a plurality of step-shaped and polygonal grooves.

11. The light guide plate according to claim 1, wherein the bottom surface comprises a plurality of scattering dots.

12. The light guide plate according to claim 11, wherein each of the scattering dots is a parallelepiped-shaped, hemispherical, cylindrical or frustum-shaped micro-prism.

13. The light guide plate according to claim 1, wherein either or both of the emitting surface and the bottom surface has an essentially concave profile.

14. A surface light source device for providing illumination for a liquid crystal display device, comprising:
   a light guide plate comprising two opposite incident surfaces configured for receiving light beams, an emitting surface between the incident surfaces configured for emitting the light beams therefrom to provide illumination for the liquid crystal display device, and a bottom surface opposite to the emitting surface; and
   two light sources disposed adjacent to the incident surfaces respectively of the light guide plate;
   wherein a thickness of a center portion of the light guide plate is less than thicknesses of two peripheral portions of the light guide plate that are at opposite sides of the center portion, and wherein the emitting surface has a V-shaped profile defined by two oblique surfaces slanting toward each other, each of the two oblique surfaces defines a plurality of V-shaped grooves extending therein and being arranged along an oblique direction thereof.

15. The surface light source device according to claim 14, wherein the two oblique surfaces are symmetric and slant toward each other at a predetermined angle.

16. The surface light source device according to claim 15, wherein the emitting surface further comprises a surface parallel to the bottom surface and interconnecting the oblique surfaces.

17. The surface light source device according to claim 14, wherein the bottom surface has a V-shaped profile defined by two symmetric oblique surfaces slanting up toward each other at a predetermined angle.

18. The surface light source device according to claim 17, wherein the bottom surface further comprises a surface interconnecting the oblique surfaces.

19. The surface light source device according to claim 14, further comprising an unitary shell-shaped reflector enclosing the light guide plate and the light sources, the reflector having an opening defined therein to expose the emitting surface.

20. A method of making a surface light source device for providing illumination for a liquid crystal display device, comprising:
   providing a light guide plate comprising two opposite incident surfaces configured for receiving light beams, an emitting surface between the two incident surfaces configured for emitting the light beams therefrom to provide illumination for the liquid crystal display device, and a bottom surface opposite to the emitting surface; and
   providing two light sources disposed adjacent to the incident surfaces respectively of the light guide plate;
   wherein a thickness of a center portion of the light guide plate is less than thicknesses of two peripheral portions of the light guide plate that are at opposite sides of the center portion, and wherein the emitting surface has a V-shaped profile defined by two oblique surfaces slanting down toward each other, each of the two oblique surfaces defines a plurality of V-shaved grooves extending therein and being arranged along an oblique direction thereof.

* * * * *